US008280718B2

(12) United States Patent
Faddoul et al.

(10) Patent No.: US 8,280,718 B2
(45) Date of Patent: Oct. 2, 2012

(54) METHOD TO PRESERVE THE PLACE OF PARENTHESES AND TAGS IN STATISTICAL MACHINE TRANSLATION SYSTEMS

(75) Inventors: Jean Baptiste Faddoul, Grenoble (FR); Francois Pacull, Crolles (FR)

(73) Assignee: Xerox Corporation, Norwalk, CT (US)

( * ) Notice: Subject to any disclaimer, the term of this patent is extended or adjusted under 35 U.S.C. 154(b) by 828 days.

(21) Appl. No.: 12/404,412

(22) Filed: Mar. 16, 2009

(65) Prior Publication Data

US 2010/0235162 A1 Sep. 16, 2010

(51) Int. Cl.
*G06F 17/28* (2006.01)

(52) U.S. Cl. .................... 704/6; 704/2; 704/4; 704/5

(58) Field of Classification Search ................. None
See application file for complete search history.

(56) References Cited

U.S. PATENT DOCUMENTS

| | | | | |
|---|---|---|---|---|
| 4,964,030 | A * | 10/1990 | Suzuki et al. ............... | 704/6 |
| 5,088,039 | A * | 2/1992 | Kugimiya et al. .......... | 704/4 |
| 5,111,398 | A * | 5/1992 | Nunberg et al. ............ | 704/9 |
| 5,477,451 | A | 12/1995 | Brown et al. | |
| RE35,464 | E * | 2/1997 | Suzuki et al. ............... | 704/2 |
| 6,304,841 | B1 | 10/2001 | Berger et al. | |
| 7,672,829 | B2 * | 3/2010 | Ishikura ....................... | 704/2 |
| 7,774,192 | B2 * | 8/2010 | Chang ......................... | 704/2 |
| 2004/0024581 | A1 | 2/2004 | Koehn et al. | |
| 2004/0030551 | A1 | 2/2004 | Marcu et al. | |
| 2007/0174040 | A1 | 7/2007 | Liu et al. | |
| 2007/0265825 | A1 | 11/2007 | Cancedda et al. | |
| 2008/0262826 | A1 | 10/2008 | Pacull | |
| 2008/0300857 | A1 | 12/2008 | Barbaiani et al. | |

OTHER PUBLICATIONS

Jean-Baptiste Faddoul, "Capitalizing Machine Translation & Preserving Tags and Parentheses," Masters thesis, Universite J. Fourier M2R Info—Xerox RCE and Lab. LIG-GETALP, 2008.*
Ma, et al., Bits: A Method for Bilingual Text Search Over the Web, In *Machine Translation Summit VII*(Sep. 1999).
Munteanu, et al., Improving Machine Translation Performance by Exploiting Comparable Corpora, In *Computational Linguistics*, 31(4), pp. 477-504 (Dec. 2005).
Rapp, Identifying Word Translations In Non-Parallel Texts, In *Proc. Ann. Meeting of the Assoc. for Computational Linguistics (COLING)* (1995).
Resnik, et al., The Web as a Parallel Corpus, In *Computational Linguistics*, 29(3), pp. 349-380 (Sep. 2003).

* cited by examiner

*Primary Examiner* — Matthew Sked
(74) *Attorney, Agent, or Firm* — Fay Sharpe LLP

(57) ABSTRACT

An apparatus, method, and a computer program product are provided for improving the translation quality of text when a text sequence, such as a sentence, includes a parenthetical part delimited by a separator or separators, such as parentheses, quotation marks, or the like. The apparatus applies an algorithm which is configured for using several methodologies in sequence to identify an optimum position for insertion of the translated parenthetical in the main part of the translated text sequence. As a result, the translated parenthetical is more likely to be correctly delimited by separators and more likely to be correctly placed in the main part than in a conventional translation system which automatically translates each sentence as a whole.

21 Claims, 9 Drawing Sheets

METHOD TO PRESERVE THE PLACE OF PARENTHESES AND TAGS IN STATISTICAL MACHINE TRANSLATION SYSTEMS

BACKGROUND

The exemplary embodiment relates to a machine translation system and method. It finds particular application in the context of preserving the place of intra-sentence separators, such as parentheses, brackets, quotes, tags, and the like during a machine translation process.

Statistical machine translation systems are often developed by inputting parallel data for the pair of languages for which the translation system is built. For example, mutual translations of source and target language texts and text fragments (parallel corpora) are used as data to feed a learning engine, which biulds a statistical language model that can then used by an actual translation tool that is used to translate any sentence of the source language into the target language. Parallel text discovery systems have been developed for identifying pairs of sentences or text fragments which are translations of one another starting from collections of parallel or comparable documents.

One problem in statistical machine translation is that the order of the words in the translated sentences is automatically learned by the system. In the learning process, the language model is trained based on n-grams (text fragments of a length n words). The language model thus captures the order of the words commonly used in a given language. For example, given the words black and cat, the system knows that black should be placed before cat because in the training corpus this combination is more frequent than the reverse order. The system may also capture statistically the information that in English, the adjective is usually positioned before the noun. In other words, the system is able to learn relative positions of the words during the training process.

When the system is faced with separators, such as parentheses, quotes, brackets, tags and the like, the statistical language model usually does not provide sufficient information to place them correctly. For example, consider the sentence:

The number of living languages (in 2007 about 6000, by most estimates) is decreasing rapidly.

A machine translation system is liable to align the words incorrectly. For example, a French translation by a statistical machine translation may be:

Le nombre de langues (en 2007, vivantes environ 6000, par la plupart) est en baisse des estimations rapidement.

Here, the two underlined groups of words are not correctly placed by the system.

The exemplary embodiment provides a system and method for statistical machine translation which takes separators, such as parentheses into consideration.

INCORPORATION BY REFERENCE

The following references, the disclosures of which are incorporated herein in their entireties by reference, are mentioned:

The following describe statistical machine translation methods and systems for natural language translation: U.S. Pat. No. 5,477,451 entitled METHOD AND SYSTEM FOR NATURAL LANGUAGE TRANSLATION, by Brown, et al., U.S. Pat. No. 6,304,841 entitled AUTOMATIC CONSTRUCTION OF CONDITIONAL EXPONENTIAL MODELS FROM ELEMENTARY FEATURES, by Berger, et al., U.S. Pub. No. 20040024581 entitled STATISTICAL MACHINE TRANSLATION, by Koehn, et al., U.S. Pub. No. 20040030551 entitled PHRASE TO PHRASE JOINT PROBABILITY MODEL FOR STATISTICAL MACHINE TRANSLATION, by Marcu, et al., and U.S. Pub. No. 20070265825, published Nov. 15, 2007, entitled MACHINE TRANSLATION USING ELASTIC CHUNKS, by Nicola Cancedda, et al., U.S. Pub. No. 20080300857, published Dec. 4, 2008, entitled METHOD FOR ALIGNING SENTENCES AT THE WORD LEVEL ENFORCING SELECTIVE CONTIGUITY CONSTRAINTS, by Barbaiani, et al., discloses a word alignment method based on a probabilistic model.

Methods for extracting bilingual lexicons from parallel or comparable corpora are described, for example, in the following references: U.S. Pub No. 20080262826, published Oct. 23, 2008, entitled METHOD FOR BUILDING PARALLEL CORPORA, by Francois Pacull, and U.S. Pub. No. 20070174040, entitled WORD ALIGNMENT APPARATUS, EXAMPLE SENTENCE BILINGUAL DICTIONARY, WORD ALIGNMENT METHOD, AND PROGRAM PRODUCT FOR WORD ALIGNMENT, published Jul. 26, 2007, by Shaoming Liu, et al., Philip Resnik, Noah A. Smith, "The Web as a Parallel Corpus," in Computational Linguistics 29 (3), pp. 349-380 (September 2003); Xiaoyi Ma and Mark Liberman, "Bits: A Method for Bilingual Text Search Over the Web, in Machine Translation Summit VII (September 1999); Dragos Munteanu and Daniel Marcu, "Improving Machine Translation Performance by Exploiting Comparable Corpora," in Computational Linguistics, 31 (4), pp. 477-504 (December 2005); and Rapp, "Identifying Word Translations In Nonparallel Texts," in Proc. Ann. Meeting of the Assoc. for Computational Linguistics (COLING) (1995).

BRIEF DESCRIPTION

In accordance with one aspect of the exemplary embodiment, a method of translation includes receiving a source text sequence to be translated from a source natural language to a target natural language. Where the source text sequence includes at least one separator which sets off a parenthetical part of the text sequence, the method includes separating the source text sequence into a source main part and a source parenthetical part and, with a computer-implemented machine translation system, translating the source main part separately from the source parenthetical part. The method further includes determining whether there is a homogeneous alignment between first and second segments of a target main part and respective first and second segments of the source main part, and if so, inserting the translation of the source parenthetical part between the first and second segments of the target main part. Where there is not such a homogeneous alignment, the method includes applying at least one heuristic for translation of the source text sequence.

In accordance with another aspect of the exemplary embodiment, a machine translation apparatus includes an input portion for receiving text to be translated from a source language into a target language. An output portion is provided for outputting a translation of the text. Memory stores a parenthetical processing component configured for identifying a location for inserting a translated parenthetical part within a translated main part of a text sequence in the text which comprises a parenthetical part. A machine translation system translates text from the source language to the target language in accordance with any requests from the parenthetical processing component. A computer processor implements the parenthetical processing component.

In another aspect, a method for preserving the place of parentheses in machine translation is provided. The method includes, in a machine translation apparatus, receiving text to be translated from a source natural language to a target natural language, automatically determining whether a text sequence of the source text includes a parenthetical part and if not, submitting the text sequence as a whole for translation into the target language and providing a translation for a text sequence which includes a parenthetical part in which the translated parenthetical part is delimited by separators and inserted in a main part of the translated text sequence at an optimal location.

DETAILED DESCRIPTION

The exemplary embodiment provides an apparatus, method, and computer program product for machine translation which takes separators, such as parentheses, into consideration.

The exemplary system and method allows translation of sentences, which include a parenthetical (any part set apart by quotation marks, tag, or the like), while finding an appropriate place for the parenthetical part within the main part of a sentence.

As used herein the term "separator" is used to describe any punctuation or tag used to set off a part of a sentence. Exemplary separators (which are usually found in a pair, one at the beginning and one at the end of the parenthetical) include parentheses (which can be shown as a pair of commas (,xxx,), dashes (e.g., -xxx- or -xxx—), round brackets ((xxx)), square brackets ([xxx]), and quotation marks (e.g. "xxx" or ?xxx¿), which delimit the beginning and end of the words in parenthesis. Other separators include tags, such as HTML tags. A "parenthetical" is used generally to refer to any text fragment (xxx in the above examples) that is delimited by separator(s) and can be a word, phrase, or multiples thereof, and which may, within it, include a further parenthetical. A "text sequence," as used herein, is generally a complete sentence, but where a sentence includes more than one parenthetical, a text sequence can be a subpart of the sentence that includes at least one parenthetical and may be, itself, a parenthetical.

Figure 1:
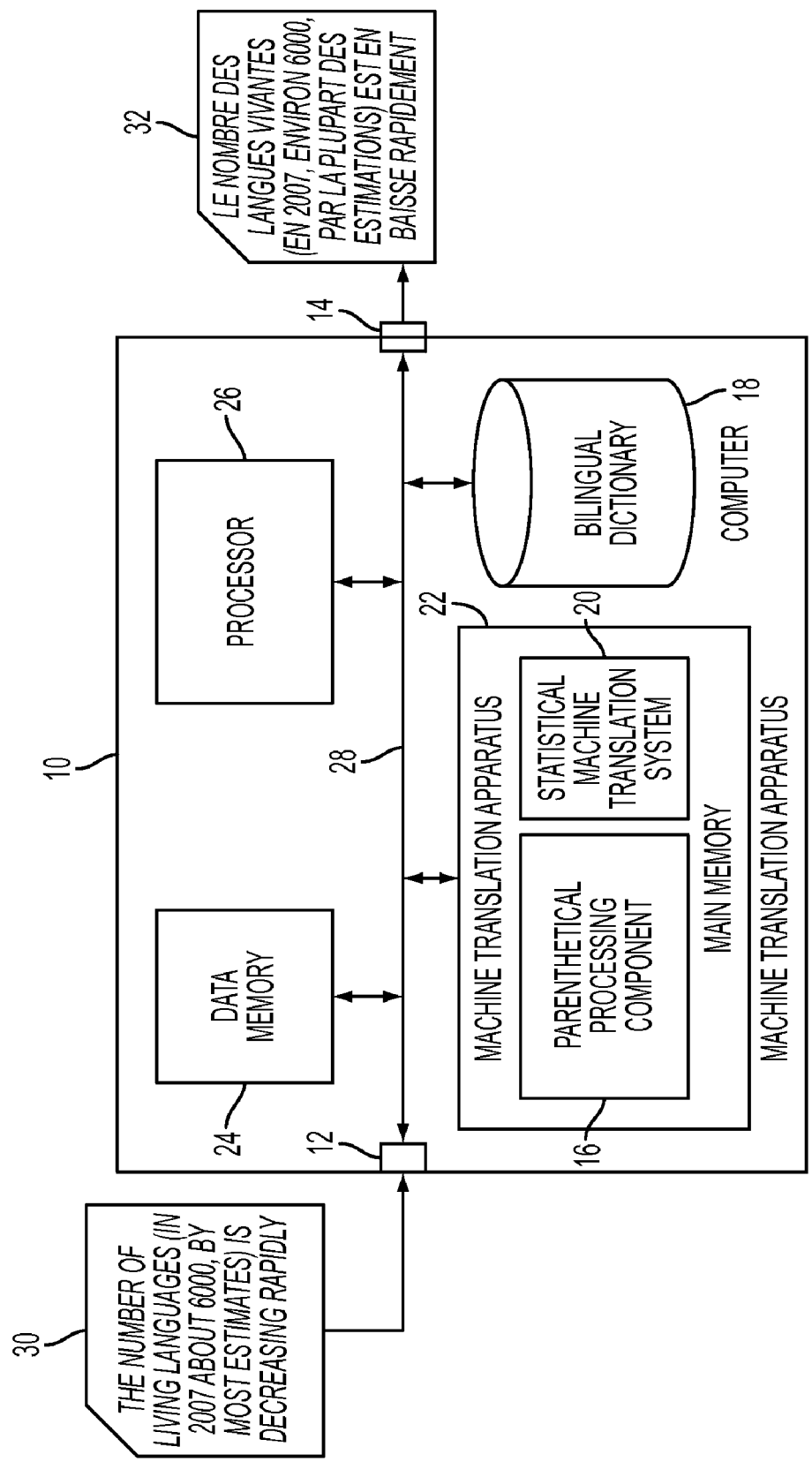
FIG. 1 is a functional block diagram of a machine translation apparatus in accordance with one aspect of the exemplary embodiment.

FIG. 1 is a functional block diagram illustrating a machine translation apparatus 10 according to one aspect of the exemplary embodiment. The exemplary translation apparatus 10 may take the form of one or more computers, such as a desktop, laptop, server, or combination thereof. The translation apparatus 10 includes an input portion 12, an output portion 14, a parenthetical processing component 16, a bilingual dictionary 18, a machine translation system 20, main computer memory 22, data memory (e.g., volatile memory) 24, and a computer processor 26, such as a CPU. Components of the apparatus 10 may communicate via a data/control bus 28.

The input portion 12 may comprise any computer operable input device for inputting source text 30 in a source language S into the apparatus 10. Exemplary of such devices are a user input device, such as one or more of a keyboard, keypad, cursor control device, joystick, haptic interface, touch screen, or the like; a network connection, a voice recognition sound receiver; a data retrieval device; e.g., a port for receiving a data storage device, such as a flash drive, disk, or the like on which the source text is stored.

The text 30, during processing, may be stored in data memory 24.

The output portion 14 may comprise any computer operable output device for outputting a translation 32 of the input text in a target language T, such as a network connection, printer, display screen, such as a computer monitor, or the like. The input portion 12 in some instances may serve as the output portion, e.g., in the case of a network connection or data port.

The bilingual dictionary 18 contains source language words and phrases together with their corresponding translations in the target language. Many machine translation systems operate by finding translations for N-grams (sequences of fixed length), where N can be for example, 3 (a trigram). The bilingual dictionary may thus store a large set of source language trigrams and their corresponding target language translations, which may have been extracted from parallel corpora (pairs of documents in which one is a translation of the other that has been generated by a human translator). The dictionary 18 may be stored in main memory 22 or in a separate database.

The machine translation system 20 may be a statistical machine translation system which takes as input a sequence of source words to be translated and outputs a translation in the target language as a sequence of words in an order which it determines to be the most probable for the given target language. The translation system may incorporate a finite-state model or probabilistic model, such as a Hidden Markov Model, which models conditional probability distributions for alignments between words of the source sentence and words of the target sentence and generates an optimal alignment based on the probabilistic model. The translation system 20 may be in the form of software or hardware or combination thereof. The translation system may be stored in main memory 22 as software which is executed by computer processor 26 or may be located elsewhere and communicatively linked to the computer for translation of source text as and when requested by the parenthetical processing component 16. Exemplary statistical machine translation systems which may be utilized herein are disclosed for example in U.S. Pat. Nos. 5,477,451 and 6,304,841 and U.S. Pub. Nos. 20040024581, 20040030551, 20070265825, and 20080300857, the disclosures of which are incorporated herein by reference.

Figure 3:
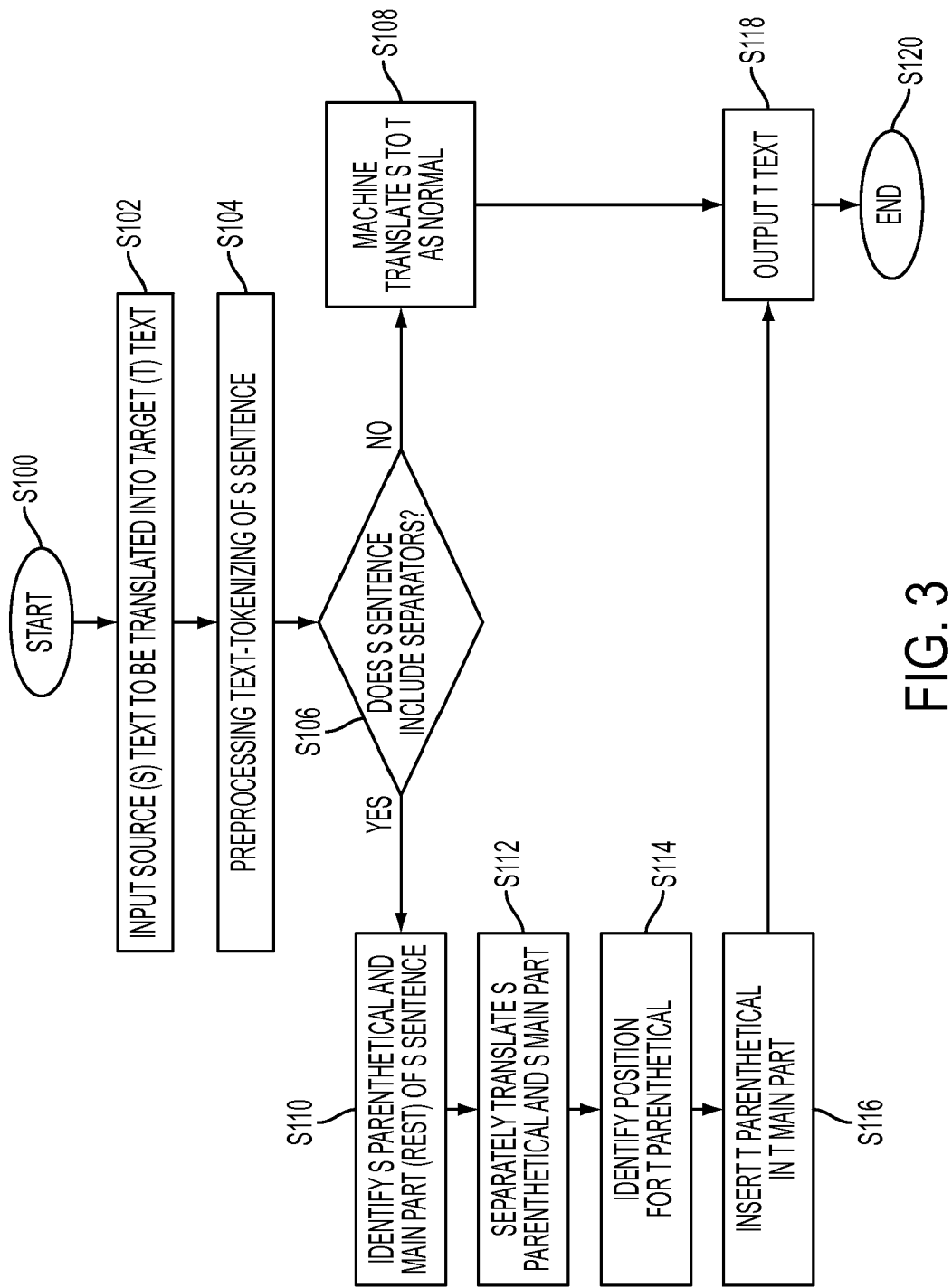
FIG. 3 is a flow diagram which illustrates a method of translation adapted to text containing parentheticals.
Figure 4:
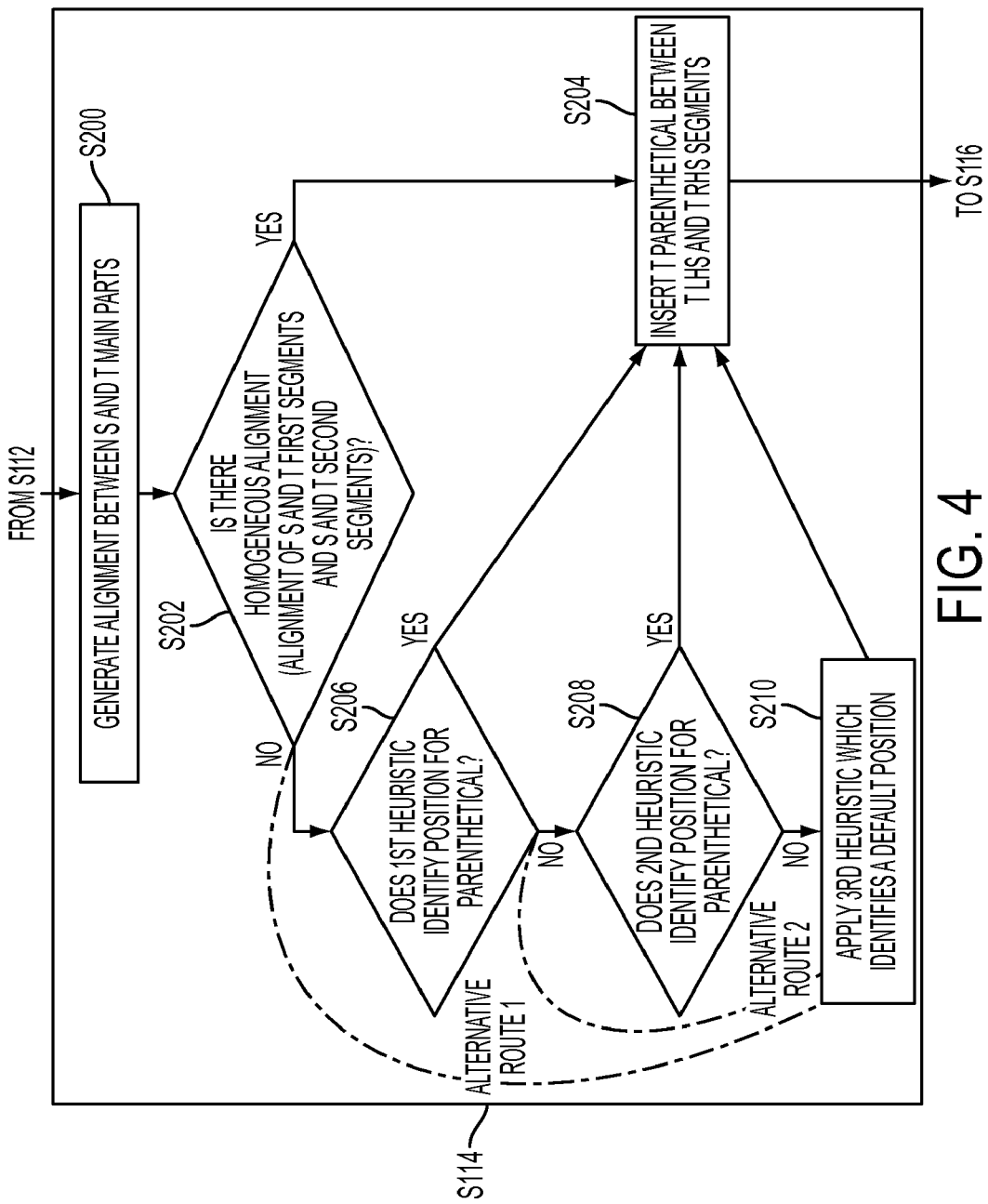
FIG. 4 illustrates a sequential method for optimizing the position of a parenthetical part in a sentence main part in the method of FIG. 3.

The processor 26 executes instructions for performing the method outlined in FIGS. 3 and 4.

The computer memory or memories 22, 24 may represent any type of computer readable medium such as random access memory (RAM), read only memory (ROM), magnetic disk or tape, optical disk, flash memory, or holographic memory. In one embodiment, the memory 22, 24 comprises a combination of random access memory and read only memory. In some embodiments, the processor 26 and memory 22 may be combined in a single chip.

The parenthetical processing component (PPC) 16 is adapted to handling source text which includes parentheticals and may be in the form of hardware, software, or a combination thereof. In the exemplary embodiment, the PPC is in the form of software instructions stored in memory 22, which are executed by processor 26. In other embodiments, the PPC may be incorporated into the machine translation system 20 or linked thereto as an add-on component.

Figure 2:
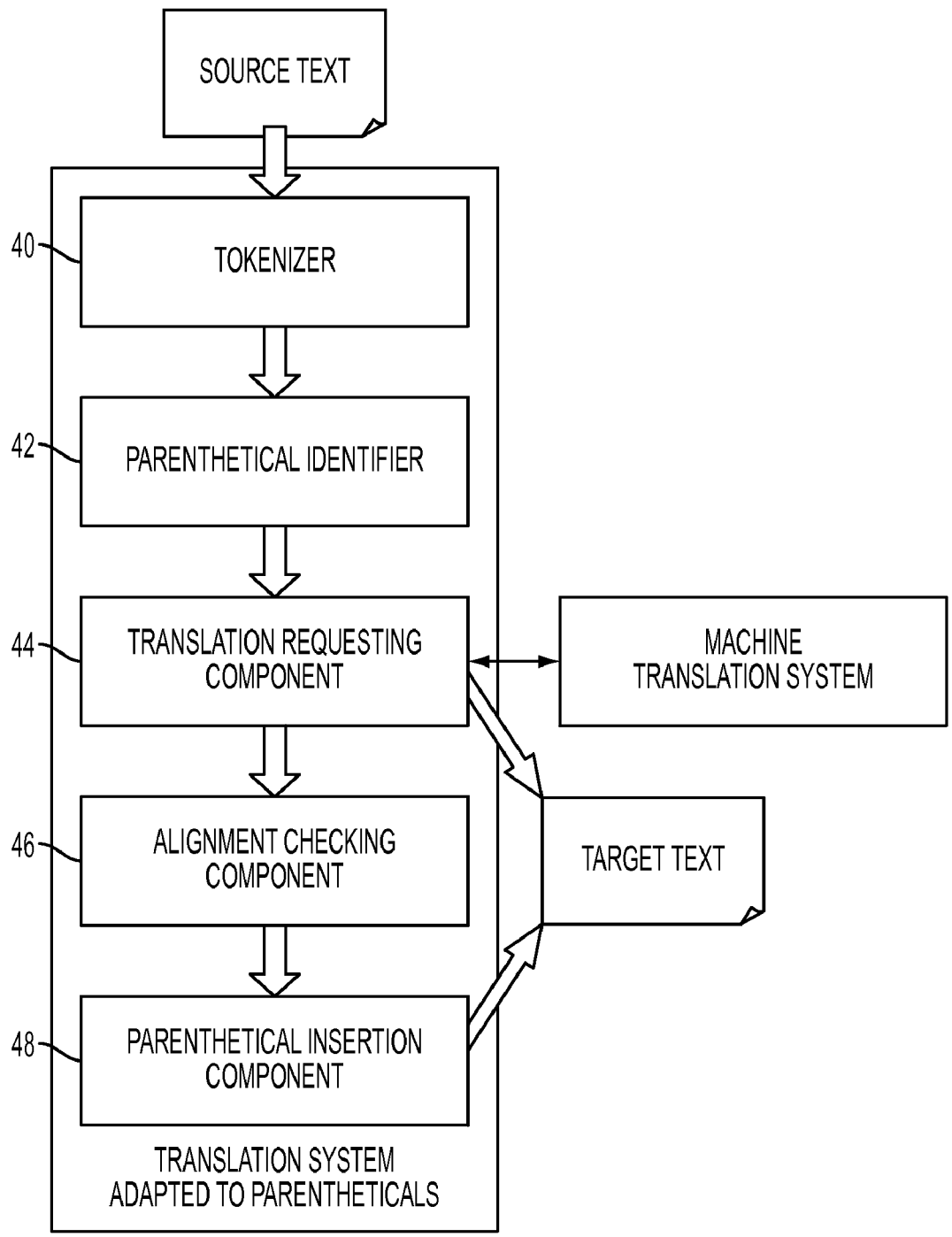
FIG. 2 is a functional block diagram of the translation system of FIG. 1.

As shown in FIG. 2, the PPC 16 may include various processing components which act generally sequentially on the text as shown, including a tokenizer 40, a parenthetical identifier 42, a machine translation request component 44, an alignment checking component 46, and a parenthetical insertion component 48. Components 40, 42, 44, 46, 48 are best understood with reference to the exemplary method described below with reference to FIGS. 3 and 4.

FIG. 3 illustrates an exemplary automated method to preserve the place of separators in machine translation, which can be used in the translation of sentences from a first natural language (source language), such as English or French, into a second natural language (target language). The method may be performed using the computer apparatus of FIG. 1. The method assumes the existence of a machine translation system 20, which may have been built using parallel corpora in the source and target languages.

The method begins at S100. At S102, text in the source language, such as a sentence, paragraph, or complete document which is to be translated, is input and may be stored in volatile memory during processing.

At S104, the text may be preprocessed by a computer pre processing component (tokenizer 40) to identify one or more sentences. Each sentence can then be treated as a sequence of tokens comprising words, separators, and other punctuation.

At S106, for each identified sentence in the source language text, a determination is made (by parenthetical identifier 42) as to whether the input sentence includes a parenthetical part, e.g., by identifying separators. If no parenthetical is identified, the method proceeds to S108, where the sentence is sent to the machine translation system 20 (by component 44) for translation as normal.

If at S106, the sentence is determined to include a parenthetical part, then at S110, a parenthetical part and a main part of the sentence (the rest) are identified and at S112 are separately translated into the target language using the machine translation system 20 to provide a target main part and a target parenthetical part as separate translations. As discussed below, translation of the parenthetical part may be performed with or without the separators.

At S114, an optimal position is identified for inserting the translated parenthetical part into the translated main part. The translated parenthetical is then inserted (by component 48) in the translated main part at this position (S116) and at S118, the translated sentence is output along with other sentences of the input text. The method ends at S120. Steps S110-S116 may be repeated for each source sentence in which a parenthetical is found. Additionally, in the case of nested parentheticals, where a first parenthetical includes a second parenthetical, steps S110-S116 may be performed (considering only the first parenthetical) to determine where the second parenthetical is inserted in first and then these steps are repeated to identify a position for the first parenthetical in the entire sequence.

With reference now to FIG. 4, further details of step S114 will now be described. At S200, an alignment is generated (e.g., by statistical machine translation system 20) between the words of the source sentence main part and the words of the target sentence main part. At S202, a check is made (by component 46) to determine whether or not the alignment is homogeneous. If the alignment is determined to be homogeneous, the parenthetical is inserted after the last target word which is aligned with a source word which precedes the parenthetical in the source sentence (S204). By "homogeneous alignment," it is meant that the words of a first contiguous sequence of words in the target main part and all words of a first segment of the source main part (preceding the parenthetical part) are aligned and also that a second contiguous sequence of words in the target main part and all words of a second segment of the source main part (following the parenthetical part) are aligned. There is thus alignment between first and second segments of the target main part with respective first and second segments of the source main part which precede and follow the parenthetical, respectively. It is not necessary for the words of the two aligned segments to have a word order correspondence, merely that all the words of one segment in the target main part are aligned to the corresponding segment of the source main part. This alignment is best understood with reference to the example below.

The method then proceeds to S116 where the parenthetical part is then inserted in the main part (by component 48) and the target language sentence is output (S118).

If at S202, the alignment is determined to be non-homogenous (lacking complete homogeneous alignment), one or more heuristics are applied in sequence for determining a location for the target parenthetical. In the exemplary embodiment, the method proceeds to S206 where a first heuristic may be applied for identifying an optimal position. If successful, the method proceeds to S204. If the first heuristic is unsuccessful, the method proceeds to S208, where a second heuristic is applied and, if successful, the method proceeds to S204. If unsuccessful, a third heuristic is applied, which places the parenthetical in a default position. The method proceeds to S204. From S204, the method proceeds to S116. As will be appreciated, the methods for determining an optimal position, where a non-homogeneous alignment is found at S202, may be modified from those proposed and may include fewer, more, or different steps.

Further details of the exemplary method now follow.

By way of example, consider the exemplary source text sequence (here a sentence):

The number of living languages (in 2007 about 6000, by most estimates) is decreasing rapidly.

The sentence can be decomposed at S110, as follows:

1. The number of living languages is decreasing rapidly. (main part)

2. in 2007 about 6000, by most estimates. (parenthetical)

Note that the main part is a combination of the words which appear in the source sentence segments occurring before and after the parenthetical. In the exemplary embodiment, the parenthetical and main part of the sentence (usually everything else) are translated separately at S112.

The translations of the two parts above are:

1. Le nombre de langues vivantes est en baisse rapidement.

2. en 2007, environ 6000, par la plupart des estimations.

This separation of parts helps the system because the trigram languages is decreasing is more likely to exist in the training corpus than the trigram languages (in. This leads to a better quality of translation of the separate parts. Moreover, part 2 (inside the parentheses) is translated as one block, without the risk that a word inside the parentheses will be translated into a word outside or vice versa. Then, an appropriate location for the parenthetical is determined (S114).

The problem at S114 is reduced to finding the best position in the translation of the main part 1 to insert the translation of the parenthetical part 2. In the present example, a human translator would consider that the best position to insert the parenthetical is after the word "vivantes."

However, it is not always simple for an automated system to find this insertion position. The following describes several heuristics which may be used in an automated system, as disclosed herein, to find this position.

Consider a source sequence S, such as a phrase or sentence, with parentheses (or other separators) which has the form:

A1 A2 A3 (B1 B2) C1 C2 C3 C4.

Where A1, A2 . . . C4 each represents a token, such as a word. First, the sequence is cut at the positions of the parentheses to get the following segments:

A1 A2 A3 (with the segment identifier A)
(B1 B2) (with the segment identifier B) and
C1 C2 C3 C4 (with the segment identifier C)

The segments A and C outside the parentheses are concatenated to create the main part 1: A1 A2 A3 C1 C2 C3 C4. The parenthetical part 2 is constituted of the segment B inside the parentheses without the parentheses themselves.

1. A1 A2 A3 C1 C2 C3 C4
2. B1 B2.

Assume that the translation of the two parts is:

1. X1 X2 X3 X4 X5 X6 X7
2. Y1 Y2.

The role of the system is to find the position in the first part (X) to insert the other part (Y) in order to get the translation of the whole phrase with a preserved parenthetical.

In addition to the translation, the statistical machine translation system 20 is able to give word alignments between the source and target sentences or separately translated subparts thereof (such as the main part in this case). The alignment ensures that each word of the source sentence (or source subpart being translated) is mapped to a corresponding word or words of the target sentence (or translated target subpart). As will be appreciated although most words have only a single counterpart in the translation, some words are translated into two words of the target sequence or vice versa, as in the case of English never and French ne . . . jamais.

Homogenous Alignments

Figure 5:
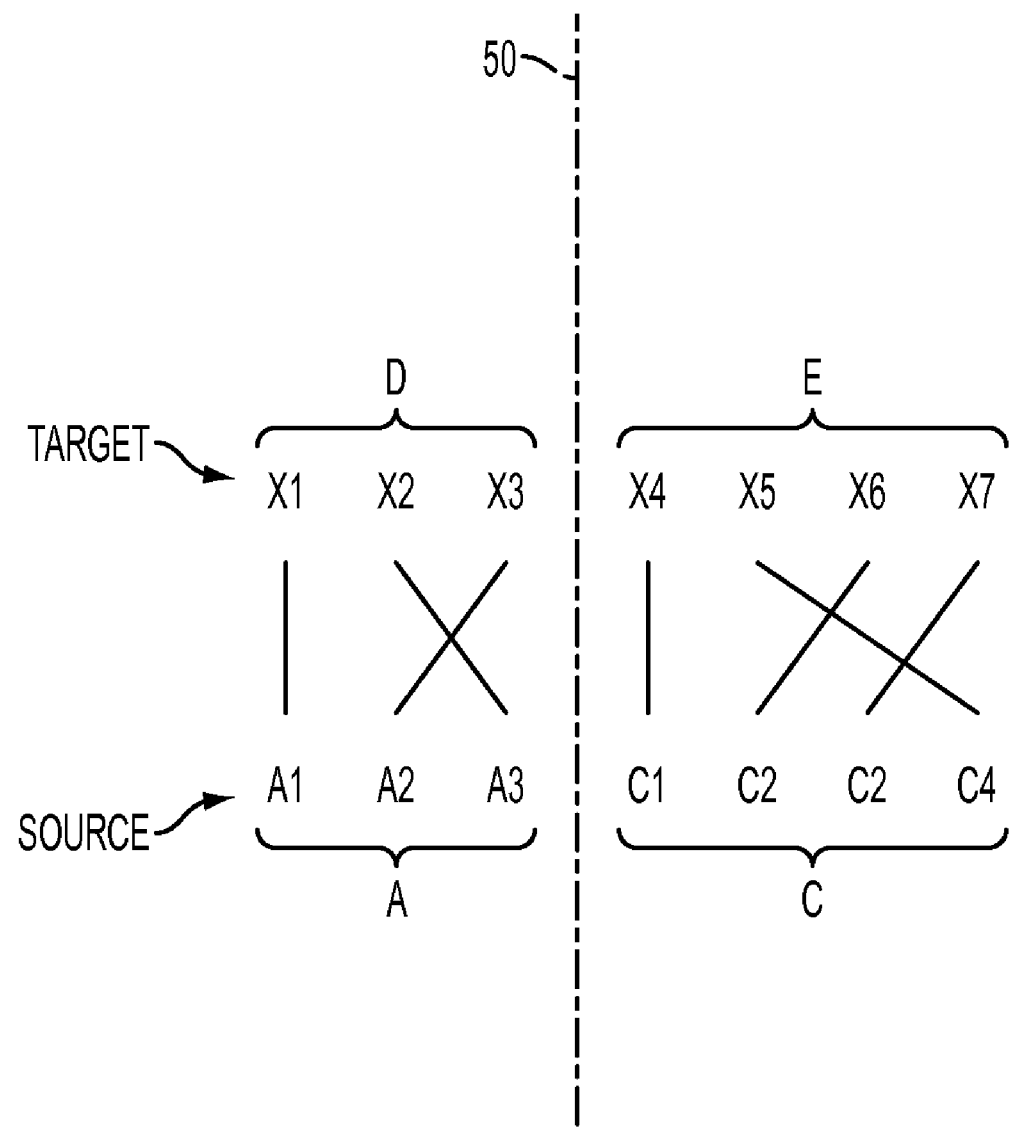
FIG. 5 illustrates a homogeneous alignment between source and target main parts when the main part is separately translated from the parenthetical part.

Suppose that the word alignment generated at S200 gives the mapping illustrated in FIG. 5.

As can be seen, the first segment X1 X2 X3 (labeled D) of the target main part is aligned to the segment A of the source main part and the second segment X4 X5 X6 X7 (labeled E) of the target main part is aligned to segment C of the source main part. This is a homogeneous alignment. The alignment between the target and source is homogeneous when it is possible to cut the translation of the part 1 (X1 . . . X7) into two segments D (X1 . . . X3) and E (X4 . . . X7), constituting a left hand side (LHS) segment and a right hand side (RHS) segment, respectively, and where each segment is aligned to only one source segment: here D is aligned to segment A and E to segment C, although this does not rule out instances where D is aligned to B and E to A.

When a homogeneous alignment is identified, the optimal position to insert the translation of part 2 is in the gap 50 between the two segments D and E which matches the gap between A and C.

Non Homogenous Alignments

Figure 6:
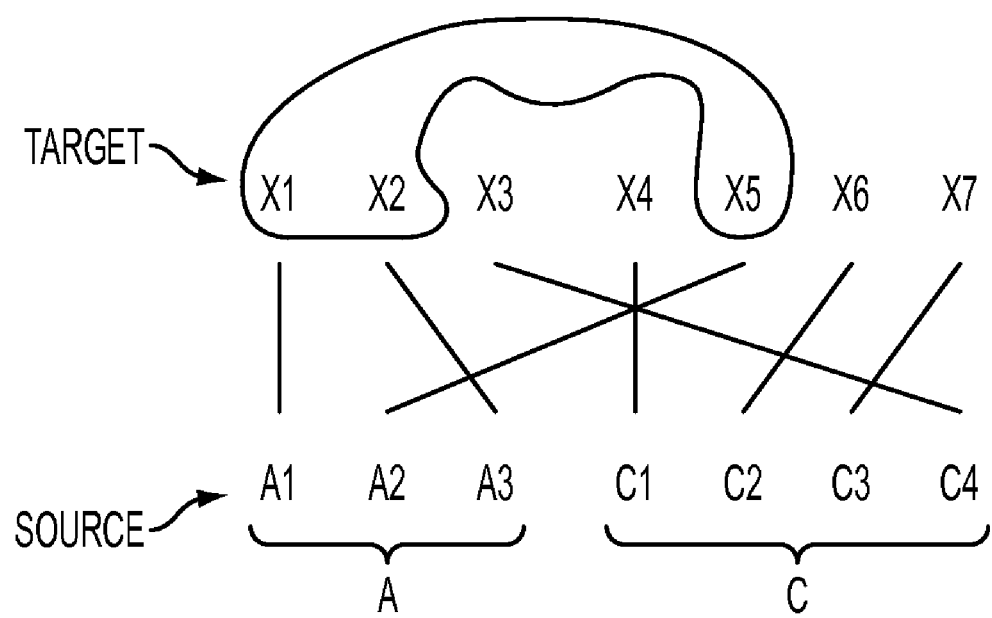
FIG. 6 illustrates a non-homogeneous alignment between source and target main parts.

FIG. 6 illustrates a case of a non-homogeneous alignment at S200. Here, the alignment check shows that there is no clear position to split the target main part, because there are no identifiable first and second segments in the target main part (a first segment of sequential words that are all aligned only with the first segment A and a second segment of sequential words that are aligned only with B). In this case, a number (here three) of heuristics are successively applied. The heuristics are methods designed to achieve an outcome that is optimal, on average, but which do not always provide an outcome which would be considered the best in all instances. The order in which the heuristics are applied may correspond to the success rating of the heuristic, as determined from experiments in which human translators assess the quality of the translations produced by the three heuristics. The most successful heuristic is applied first, and so on. In the exemplary embodiment, the method proceeds first to S206.

Figure 7:
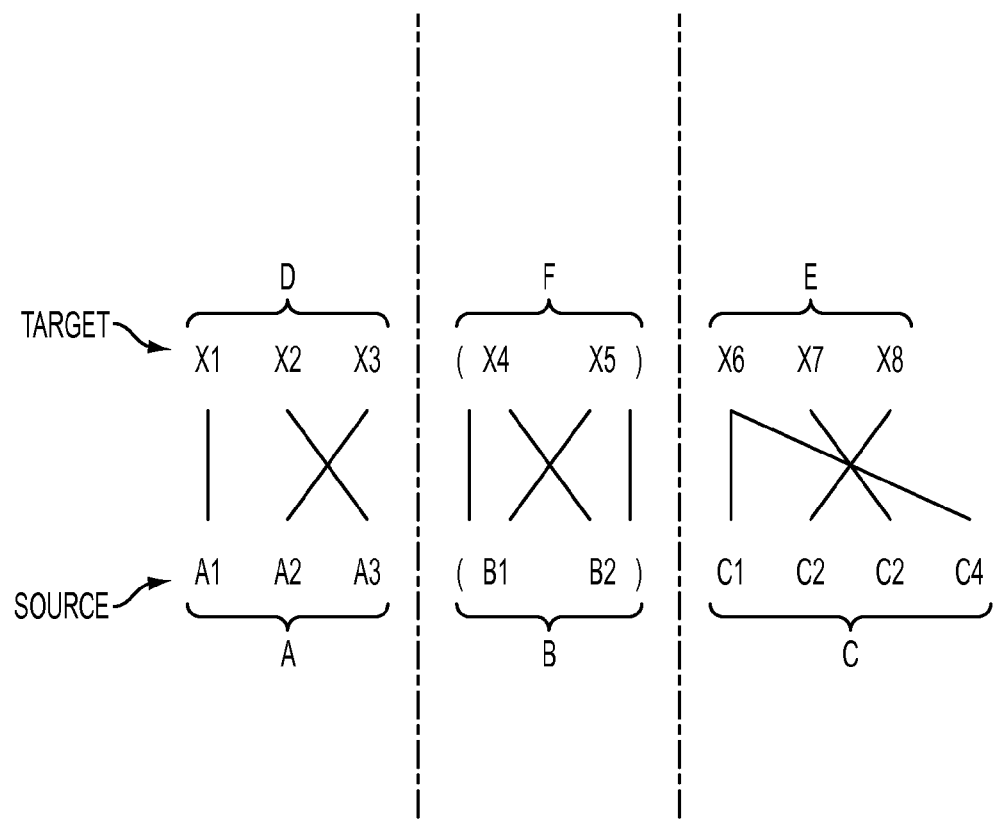
FIG. 7 illustrates generation of a homogeneous alignment using a first heuristic.

1. First Heuristic:

At S206, the first heuristic is applied. In the exemplary embodiment, this includes determining whether a translation T of the entire source sequence S preserves the homogeneous alignment criterion plus the boundaries of the parentheses. For example, FIG. 7 illustrates an exemplary output which may be achieved. As can be seen, segment D is aligned with segment A, segment E is aligned with segment C and segment F (the words in the translated parenthesis) is aligned with segment B. Thus, the first heuristic concludes that the parenthetical should be inserted as indicated by the translation.

If the translation of the entire sequence does not produce such an alignment, the method proceeds to the second heuristic.

Figure 8:
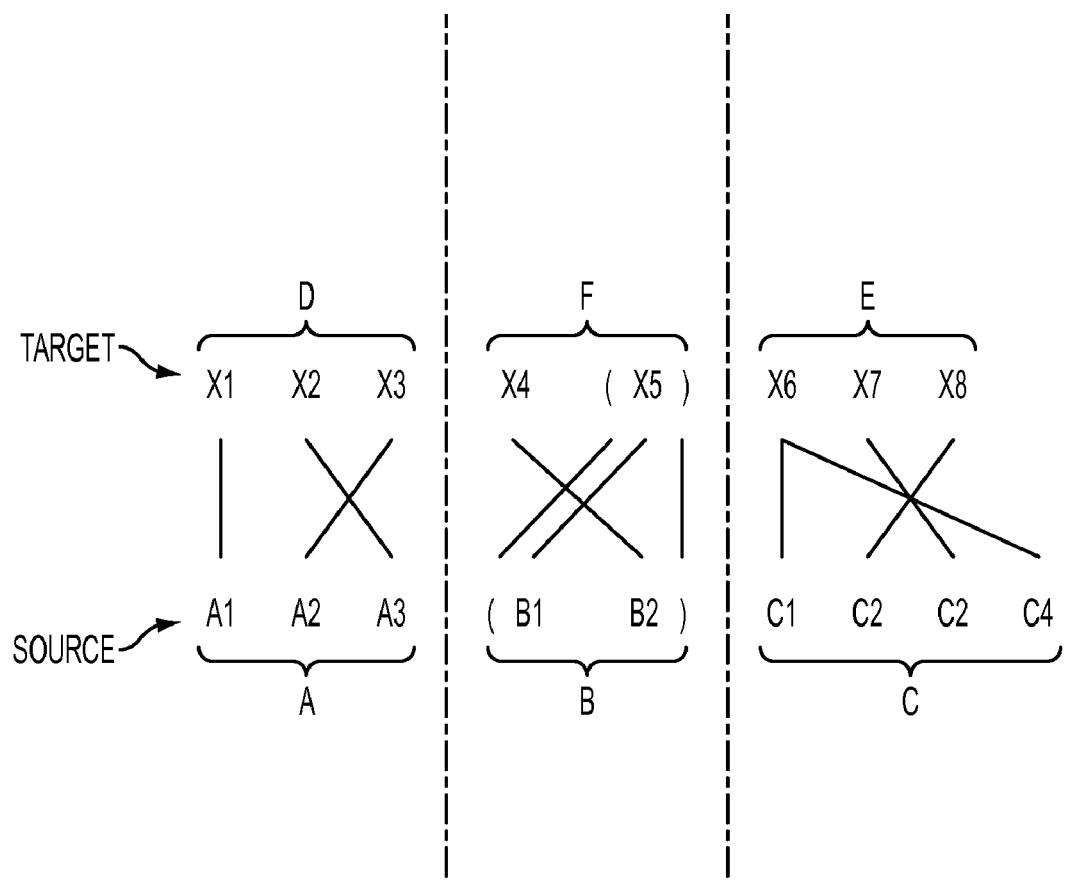
FIG. 8 illustrates lack of a homogeneous alignment using the first heuristic.

2. Second Heuristic:

If the first heuristic gave the type of result shown in FIG. 8, i.e., where there is a homogeneous alignment between the sequences except that one or more words which should be in the parenthesis are outside in the T sequence, and/or vice versa, it can be concluded that using something in between the segment A and C helped the system to keep the boundary between the segment A and C. In this case, at S208, the second heuristic replaces the parentheses and words within it with an atomic symbol (an untranslatable placeholder) between the two segments A and C. The machine translation system is requested to provide a translation of this modified source sequence S with the atomic symbol. In the illustrated example, the symbol is inserted as follows:

A1 A2 A3 ##### C1 C2 C3 C4.

The symbol ##### is not known by the system and thus will be left verbatim after the translation.

Figure 9:
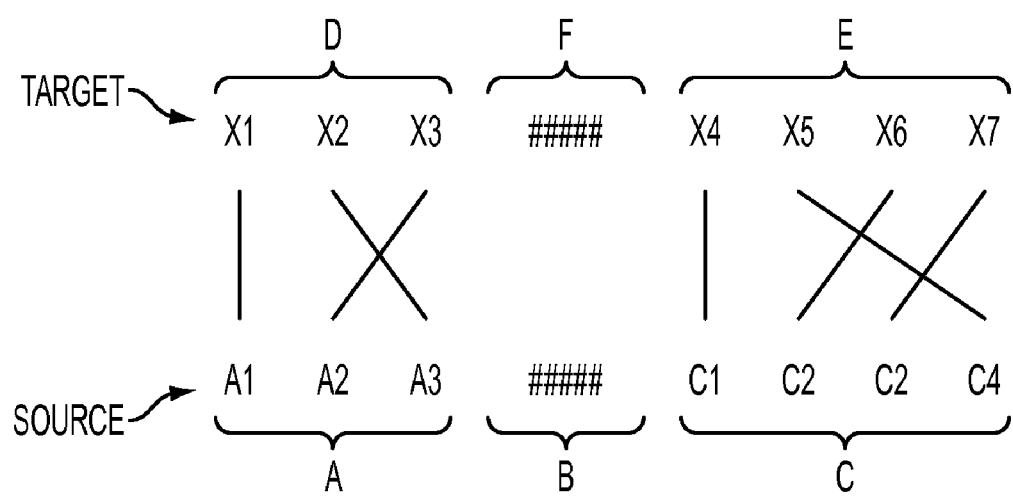
FIG. 9 illustrates obtaining a homogeneous alignment through use of a placeholder for the parenthetical part.

If the result is a homogeneous alignment, as exemplified in FIG. 9, then the placeholder #### is simply replaced with a translation of the parenthetical part B.

If the result of the translation performed in the second heuristic is not a homogeneous alignment, the method proceeds to the third (default) heuristic.

3. Last Heuristic:

The last alternative (S210) is used when all the other heuristics have failed to provide a homogeneous solution. This may typically apply for only about 1% of the parenthetical-containing sentences. In most of these cases, the sentences are often so complicated that the problem of preserving the place of the parentheses is really not the most important issue. In this case, the following heuristic may be used. The three 3 segments A, B and C are considered independently and translated separately. So, for example, the following translations may be obtained:

| | | |
|---|---|---|
| A1 A2 A3 | (segment A) → | Translated into X1 X2 X3 |
| (B1 B2) | (segment B) → | Translated into (Y1 Y2) |
| C1 C2 C3 C4 | (segment C) → | Translated into Z1 Z2 Z3 Z4 |

The translated segments are simply concatenated to form the target sequence: X1 X2 X3 (Y1 Y2) Z1 Z2 Z3 Z4.

An alternative default heuristic is to provide the source sentence as input to the translation system and let it to manage the parentheses. In experimental tests, however, the three segment translation gives superior results, on average, in the machine translation system evaluated. This may be because the segments are smaller than the whole sentence and as the translation quality is usually impacted by the size of the sentence, better results are obtained when the translation of the segments is concatenated. An intermediate alternative would be to translate A(B) and C separately and concatenate the two parts (or alternatively for A and (B)C).

While particular reference has been made to parentheses, the system and method are equally applicable to other separators, such as square brackets, quotation marks, commas and tags, such as HTML or SGML tags, and the like.

As will be appreciated, the number of heuristics is not limited to three, but may include 2, 4, or more heuristics. For example, as shown in FIG. 4, an alternative route may be to skip one or both of the first and second heuristic and proceed to the last heuristic (see, e.g., alternative routes 1 and 2).

The exemplary apparatus and method have been tested with various corpus and language pairs and various separators. In all cases, good results were obtained.

Multiple Parentheses:

The machine translation apparatus 10 is able to manage sentences with nested parenthetical structures, such as:

A1 A2 A3 (B1 B2 "C1 C2 C3" D1) E1 E2.

In this case, the inner-most parenthetical may be processed first (i.e., by considering the text sequence B1 B2 "C1 C2 C3" D1 using the method described above. Once this has been done, the sequence A1 A2 A3 (###1###) E1 E2 is processed, where ###1### is a placeholder for the previously found translation of B1 B2 "C1 C2 C3" D1. The replacement of the placeholder(s) is performed at the end. This replacement can be recursive when several levels of nested parentheses are considered.

The apparatus 10 is also able to manage sentences with multiple parenthetical structures at the same level such as:

A1 A2 A3 (B1 B2) C1 C2 "D1 D2 D3" E1 E2

In this case, one of two methods can be applied. The first is to consider the sentence as having more than three segments. The second approach is to use a variant of the nested approach. In the example above, for example, a first stage would be to apply the method to A1 A2 A3 (B1 B2) ###1###. (or alternatively, ###1### "D1 D2 D3" E1 E2.)

ALTERNATIVE EMBODIMENTS

When translating the part 2, there is a choice between translating the parenthetical B only or translating the parenthetical and separators: i.e., translating either (B1 B2) or translating B1 B2 and adding the parentheses later. This can lead to different results in some instances.

For example, consider the following example. If the B part is (a). This is used, for instance, to label sections and thus may be well-represented in the bilingual dictionary. Thus, in translating (a) from French to English, it is very likely that the result obtaining will be (a) because the language model will find trigrams of the form (a) in its data.

In translating a alone, it is quite probable that the result obtained will be has as the English translation. Then, when the parentheses are added, the whole segment would be (has) as the translation of (a). That is not correct in most cases.

Consider another example: if part 2 is (le chat noir), then a translation of the parenthetical and parentheses together could yield the black (cat), which is incorrect. In this example, it would be preferable for the system to translate le chat noir and to enclose the results with the parentheses in a second step.

Rather than selecting one or other of these options when translating the parenthetical, the following heuristic may be applied:

First, translate the parenthetical together with the enclosing parentheses. If in the translation, the parentheses are well placed (i.e., surround the parenthetical), then this solution is retained since it indicates that the machine translation system 20 made good use of the parentheses in its language model. If the parentheses are not correctly placed, this indicates that the parentheses did not help the system 20. In this case, the translation of the parenthetical alone is used, followed by adding the parentheses in a second step. This can be expected to result in a better translation than the one obtained with the segment enclosed by parentheses.

The method illustrated in FIGS. 3 and 4 may be implemented in a computer program product that may be executed on a computer. The computer program product may be a tangible computer-readable recording medium on which a control program is recorded, such as a disk, hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the computer program may be embodied in a transmittable carrier wave in which the control program is embodied as a data signal. Suitable transmission media may include acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 3 and 4, can be used to implement the method for handling separators in machine translation.

Without intending to limit the scope of the exemplary embodiment, the following examples demonstrate application of the method.

EXAMPLES

Different parallel corpora were used in the following Examples:

European Parliament (Euro-parl), English-French
Printer manufacturer documentation, English-French
European Parliament (Euro-parl), English-Spanish
Automotive documentation, English-Danish
Several examples of sentences have been extracted to show the improvement that the exemplary method can obtain.

Shown below are S: the source sentence taken from the original document of a parallel corpus, R: the reference translation (what a human translator did), taken from the translated document of the parallel corpus, the automatic translation without the exemplary method (−) and finally, the automatic translation using the exemplary method (+). The statistical machine translation system was the same for both (−) and (+), the only difference being the handling of parentheticals.

Sentence 1:
S: installer la machine sur une surface dure et plane (non pas sur un tapis épais) capable de supporter son poids.
R: place the machine on a level, solid surface (not on a thick pile carpet) that has adequate strength to support the weight of the machine.
−: install the machine on a flat surface (not on and hard carpet a) thick that is able to support the machine weight.
+: install the machine on a flat surface and hard (not on a thick carpet) that is able to support the machine weight.

Sentence 2:
S: remettez le commutateur en position haute ("on") et vérifiez si l'alimentation est rétablie.
R: flip the switch ("on") and determine if electrical power has been restored.
−: flip the switch position ("and" on) check if the power is restored.
+: flip the switch position ("on") and check if the power is restored.

Sentence 3:
S: (dado que se han levantado más de doce diputados, la enmienda oral es rechazada) (el parlamento aprueba la resolución)
R: (since more than 12 members of parliament stood up, the oral amendment was not retained) (parliament adopted the resolution)
−: (since more than 12 members rose, the oral amendment ( ) is rejected parliament adopted the resolution)
+: (since more than 12 members rose, the oral amendment is rejected) (parliament adopted the resolution)

Sentence 4:
S: la résolution dit "pour autant que cet objectif (la stabilité des prix) soit attaint."
R: in the resolution it says "providing that this objective of (price stability) is attained."
−: the resolution says "provided that this objective of price) (is achieved stable."
+: the resolution says "provided that this objective of (price stability) is achieved."

As the sentences above demonstrate, a much improved translation is achieved with the present algorithm 16 over the conventional machine translation system.

Metrics may also be used to evaluate the machine translation output. These metrics are intended to calculate how close the translation is to the reference text. The reference text is given by a human expert and is considered as the optimal translation (although it will be appreciated that it may not always be—see, for example R in Sentence 4 above, where the word "of" should have been included within the parentheses to be grammatically correct).

In conventional metrics often used (such as BLEU and NIST scores), a word correctly translated but placed in the wrong place regarding to the parentheses will not be penalized too much, if at all. However, as seen from the conventional machine translations above, misplaced parentheses can make quite a difference to the human understanding of the translation. With the present understanding of the importance of correctly placing the parentheses (and other separators), the evaluation should provide an indication not only of the quality of the translation but also the extent to which preservation of the parentheses occurs. The present metric thus places a higher penalty on the incorrect placing relative to the parentheses.

In order to capture how much the translated text preserves the parentheses, the conventional metrics were applied, but on each of the parts (main part and parenthetical). Thus, for a sentence containing N parentheticals there are N+1 parts to analyze. Three metrics were used in this analysis: the BLUE, NIST, and the exact word match, which is a simple metric that counts the number of words that appear in both the reference and the translated text in the same position. The results are given in Table 1, where for each corpus the first column (conv'l) gives the results without the treatment of parentheses (or other separators) and the second column (present) gives the result after the treatment of parentheses and other separators. A higher score indicates a better quality of translation, on average.

TABLE 1

| Corpus | Euro-parl French-English | | Printer manufacturer's documents French-English | | Euro-parl Spanish-English | |
|---|---|---|---|---|---|---|
| | Conv'l | Present | Conv'l | Present | Conv'l | Present |
| NIST | 5.0282 | 6.8270 | 4.5101 | 5.3271 | 4.8252 | 5.5670 |
| Bleu | 0.2098 | 0.2924 | 0.2684 | 0.3310 | 0.2285 | 0.2737 |
| Exact match | 4666 | 5778 | 1575 | 1785 | 453 | 548 |

As can be seen, the present system gives higher scores for each of the metrics than a conventional machine translation system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A method of translation, comprising:
receiving a source text sequence to be translated from a source natural language to a target natural language;
where the source text sequence includes at least one separator which sets off a parenthetical part of the text sequence:
separating the source text sequence into a source main part and a source parenthetical part;
with a computer-implemented machine translation system, translating the source main part separately from the source parenthetical part;

determining whether there is a homogeneous alignment between first and second segments of a target main part and respective first and second segments of the source main part, and if so, inserting the translation of the source parenthetical part between the first and second segments of the target main part; and where there is not such a homogeneous alignment, applying at least one heuristic for translation of the source text sequence.

2. The method of claim 1, wherein the separators are selected from the group consisting of parentheses, brackets, quotation marks, comma pairs, tags, and combinations thereof.

3. The method of claim 1, wherein the text sequence comprises at least one of a) a sentence and b) a first parenthetical part of a sentence which includes within it a second parenthetical part.

4. The method of claim 1, wherein the determining whether there is a homogeneous alignment includes generating an alignment between words of source main part and corresponding words of the target main part.

5. The method of claim 1, wherein the parenthetical part comprises a parenthetical set off by first and second separators and wherein the translation of the parenthetical part comprises:

translating the parenthetical together with the first and second separators and, where the translation places the parenthetical wholly within the separators, inserting the translation of the parenthetical part between the first and second segments of the target main part, and otherwise, translating the parenthetical first and then inserting the separators around the translated parenthetical before inserting the translation of the parenthetical part between the first and second segments of the target main part.

6. The method of claim 1, wherein the applying of the at least one heuristic includes applying a first heuristic for translation of the source text sequence comprising:

translating the entire source text sequence into a target text sequence;

determining whether the target text sequence is in homogeneous alignment with the source text sequence whereby, in the target text sequence, a parenthetical part spaces first and second target main part segments, the first and second target main part segments being in alignment with respective first and second source main part segments of the source text sequence, and if so, adopting the translation as the translation of the text sequence; and otherwise, applying at least one second heuristic for translation of the text sequence.

7. The method of claim 6, wherein the applying of the at least one second heuristic for translation of the text sequence comprises:

replacing the parenthetical part of the source text sequence with a placeholder;

translating the source text sequence including the placeholder into a target text sequence with the placeholder and, where there is a homogenous alignment between the target text sequence with the placeholder and the source text sequence with the placeholder, replacing the placeholder with a translation of the parenthetical part; and otherwise, applying at least one third heuristic for translation of the text sequence.

8. The method of claim 7, wherein the applying of the at least one third heuristic comprises: at least one of:

a) a heuristic which includes:

identifying first and second segments of the main part of the source text sequence, the first segment preceding the parenthetical part, the second segment following the parenthetical, separately translating the parenthetical part from at least one of the first segment and the second segment, and concatenating the separately translated parenthetical part and the at least one of the first segment and the second segment; and b) a heuristic which includes submitting the entire text sequence to the machine translation system and allowing it to place the parentheses.

9. The method of claim 8, wherein the separately translating the source parenthetical part from at least one of the first segment and the second segment, includes separately translating the first segment, second segment, and parenthetical part and concatenating the separately translated first segment, parenthetical part, and second segment in sequence.

10. The method of claim 1, wherein the applying of the at least one heuristic comprises at least one of:

a) applying a first heuristic which comprises:

translating the entire source text sequence into a target text sequence, and determining whether first and second segments of the target text sequence are in homogeneous alignment with respective first and second segments of the source text sequence, the first and second and second segments of the target text sequence being spaced by a parenthetical part, and if so, adopting the translation as the translation of the text sequence;

b) applying a second heuristic which comprises:

replacing the parenthetical part of the source text sequence with a placeholder, and translating the source text sequence including the placeholder into a target text sequence including the placeholder and, where there is a homogenous alignment between the first and second segments of the source text sequence and respective first and second segments of the target text sequence which are spaced by the placeholder, replacing the placeholder with a translation of the parenthetical part; and c) applying a third heuristic which comprises:

identifying first and second segments of the main part of the text sequence, the first segment preceding the parenthetical part, the second segment following the parenthetical;

separately translating at least one of the first segment and the second segment separately of the parenthetical part; and concatenating the separately translated parts.

11. The method of claim 10, wherein the first, second, and third heuristics are applied in sequence where a previous heuristic fails to provide a homogeneous alignment.

12. The method of claim 1, further comprising, where the received text sequence comprises nested parentheticals:

applying the method first to a text sequence which comprises within it the most nested parenthetical; and repeating the method sequentially for each subsequent most nested parenthetical.

13. The method of claim 12, wherein in the repeating, a placeholder is used to preserve a location of the previously translated text sequence.

14. The method of claim 1, further comprising outputting the translated text sequence.

15. The method of claim 1, further comprising submitting a text sequence in the form of a sentence which does not include at least one separator for translation as a whole by a machine translation system.

16. A computer program product comprising a non-transitory computer-readable medium encoding instructions, which when executed on a computer causes the computer to perform the method of claim 1.

17. A machine translation apparatus comprising:
computer memory which stores instructions for performing the method of claim 1; and
a computer processor in communication with the memory for executing the instructions.

18. A machine translation apparatus comprising:
an input portion for receiving text to be translated from a source language into a target language;
an output portion for outputting a translation of the text;
memory which stores a parenthetical processing component configured for identifying a location for inserting a translated parenthetical part within a translated main part of a text sequence in the text which comprises a parenthetical part, the parenthetical processing component including:
a parenthetical identifier which determines whether a text sequence of the source text includes a parenthetical part,
a machine translation request component configured for requesting separate translations of the parenthetical part and a main part of the source text sequence,
an alignment checking component configured for determining whether there is a homogeneous alignment between first and second segments of the main part of the source text sequence and respective first and second segments of a target main part, enabling a translation of the parenthetical part to be inserted in a gap between the first and second segments of the translated main part, and
a parenthetical insertion component configured for inserting the translation of the parenthetical part in the gap;
a machine translation system which translates text from the source language to the target language in accordance with any requests from the parenthetical processing component; and
a computer processor which implements the parenthetical processing component.

19. The apparatus of claim 18, further comprising a bilingual dictionary for the source and target languages, which is accessible to the machine translation system.

20. A method for preserving the place of parentheses in machine translation, comprising:
in a machine translation apparatus, receiving text to be translated from a source natural language to a target natural language;
automatically determining whether a text sequence of the source text includes a parenthetical part and if not, submitting the text sequence as a whole for translation into the target language; and
where the text sequence of the source text includes a parenthetical part, providing a translation of the text sequence in which a translated parenthetical part is set off by separators and inserted in a translated main part of the text sequence at an optimal location, the providing of the translation of the text sequence which comprises a parenthetical part comprising:
separating the text sequence into a main part and a parenthetical part;
with a machine translation system, translating the main part separately from the parenthetical part;
determining whether there is a homogeneous alignment between the translation of the main part and the main part of the text sequence, enabling a translation of the parenthetical part to be inserted in a gap between first and second segments of the translated main part, and if so, inserting the translation of the parenthetical part in the gap; and
where there is not a homogeneous alignment, applying at least one additional heuristic for translation of the text sequence.

21. A computer program product comprising a non-transitory computer-readable medium encoding instructions, which when executed on a computer, causes the computer to perform the method of claim 20.

\* \* \* \* \*